United States Patent [19]

Colmenares et al.

[11] Patent Number: 4,532,230

[45] Date of Patent: Jul. 30, 1985

[54] HIGH SURFACE AREA THO₂ CATALYST AND METHOD OF PREPARING IT

[75] Inventors: Carlos A. Colmenares, Alamo; Gabor A. Somorjai, Berkeley; Joseph J. Maj, Walnut Creek, all of Calif.

[73] Assignee: The United States of America as represented by the United States Department of Energy, Washington, D.C.

[21] Appl. No.: 506,559

[22] Filed: Jun. 21, 1983

[51] Int. Cl.³ .......................... B01J 23/12; B01J 23/04
[52] U.S. Cl. .................................... 502/344; 502/300; 423/252
[58] Field of Search ................. 423/252; 502/300, 344

[56] References Cited

U.S. PATENT DOCUMENTS 3,214,238 10/1965 Rombau et al. ...................... 502/300
3,370,016 2/1968 Briggs .................................. 423/252
3,666,426 5/1972 Burkhardt ............................ 423/252

OTHER PUBLICATIONS

Pichler et al., *Brennstoff-Chemie*, 30, (1949), pp. 13–23.

*Primary Examiner*—W. J. Shine
*Attorney, Agent, or Firm*—Paul Davis; Harold M. Dixon; Judson R. Hightower

[57] ABSTRACT

A $ThO_2$ catalyst having a high surface area of about 80–125 $m^2/g$ is synthesized. The compound is synthesized by simultaneously mixing an aqueous solution of $ThNO_3(NO_3)_4.4H_2O$ with an aqueous solution of $Na_2CO_3.H_2O$, to produce a solution and solid $ThOCO_3$. The solid $ThOCO_3$ is separated from the solution, and then calcined at a temperature of about 225°–300° C. for about 40–55 hours to produce $ThO_2$. The $ThO_2$ catalyst produced includes Na present as a substitutional cation in an amount equal to about 5–10 atom percent.

15 Claims, 1 Drawing Figure

HIGH SURFACE AREA ThO$_2$ CATALYST AND METHOD OF PREPARING IT

The U.S. Government has rights in this invention pursuant to Contract No. W-7405-ENG-48 between the U.S. Department of Energy and the University of California, for the operation of Lawrence Livermore National Laboratory.

BACKGROUND OF THE INVENTION

This invention relates generally to a ThO$_2$ catalyst, and more particularly, to a ThO$_2$ catalyst having a high surface area.

ThO$_2$ has found widespread use as a catalyst, particularly for the catalysis of hydrocarbon synthesis.

Previously, ThO$_2$ has been synthesized by the decomposition of Th nitrate, oxalate and hydroxide (Morehead, D. R., McCartney, E. R., *J. Aust. Ceram. Soc.*, 12, 1977, pp. 27-33). In this method of synthesis, the respective compounds are thermally decomposed in flowing air and nitrogen, and under vacuum conditions. This method of synthesis produces ThO$_2$ compounds having the following surface areas:

TABLE I

|  | Surface area of ThO$_2$ (m$^2$/g) |
| --- | --- |
| Thorium Oxalate | 50 |
| Thorium Nitrate | 44 |
| Thorium Hydroxide | 39 |

In another synthesis method, thorium hydroxide is precipitated from a solution of thorium nitrate by the addition of ammonia, followed by filtering, washing, and drying of the precipitate, and inactivation by heating at a suitable elevated temperature between about 400° and 800° C. (Brey, W. S.; Davis, B. H.; Schmidt, P. G.; and Moreland, C. G.; *J. Cat.* 3, 1964, pp 303-311). This work discloses that both the conditions of the precipitation of the hydroxide and the conditions of conversion of the hydroxide to the oxide affect the properties of the final product. It also discloses that two of the qualitative circumstances surrounding the formation of the hydroxide from which the oxide is derived were found to be significant. It was discovered that the rate at which ammonia was added to the solution of thorium nitrate contributed to the ThO$_2$ surface area. In this regard, a rapid rise of surface area of ThO$_2$ was observed during the early washing stages, followed by a maximum value beyond which there was a plateau or slow decline with further washing.

The time of heating of the material during the preparation of the oxide was also found to affect the oxide surface area. The longer the time of heating, the smaller the surface area. However, this method yields a ThO$_2$ catalyst having a surface area of no more than about 50 m$^2$/g.

A third method of ThO$_2$ synthesis is disclosed in Breysse, M., *Ann. Chem.*, 2 (1967), pp 367-389. In this synthesis method, ThO$_2$ is produced by calcination of the oxalate. This is achieved by precipitating the salt by the action of oxalic acid on a solution of thorium nitrate. The investigators concluded that the surface area of ThO$_2$ increases with: the initial pH of the thorium nitrate solution; the concentration of thorium nitrate; time to mix the reactants; precipitation temperature; and time of aging. A complete list of the parameter study, parameter variations, and surface area of ThO$_2$ is listed in Table II.

TABLE II

| Parameter Studied | Parameter Variation | ThO$_2$ spent area, m$^2$/g |
| --- | --- | --- |
| Initial pH of | 2.2 | 33 |
| nitrate solution | 0.7 | 36 |
| Rate of addition | 50 ml in 20 min. | 12 |
|  | 50 ml in 60 min. | 25 |
| Order of addition | acid into nitrate | 40 |
|  | nitrate into acid | 34 |
| Concentration of | M | 40 |
| thorium nitrate | M/10 | 27 |
| solution | M/50 | 18 |
| Concentration | 0 | 28 |
| ratio: excess | 20% | 24 |
| acid | 100% | 19 |
| Precipitation | 34° C. | 17 |
| temperature | 75° C. | 24 |
|  | boiling | 33 |
| Aging of | 0 | 24 |
| precipitate | 1 hour | 28 |
|  | 4 hours | 30 |

Interestingly, the investigators disclosed that the slower the rate of addition of the reactants, the greater the surface area. The largest ThO$_2$ surface area obtained by varying the parameters was about 40 m$^2$/g.

It would be an advancement in the art to provide a method for synthesizing a ThO$_2$ catalyst having a surface area of at least 100 m$^2$/g. Such a catalyst would provide powerful catalytic behavior never before attained.

SUMMARY OF THE INVENTION

Accordingly, an object of the invention is to provide a method for synthesizing a high surface area ThO$_2$ catalyst.

Another object of the invention is to provide a method for synthesizing a ThO$_2$ catalyst having a surface area of about 80-125 m$^2$/g.

A further object of the invention is to provide a method for synthesizing a high surface area ThO$_2$ catalyst with Na present as a substitutional cation.

Yet another object of the invention is to provide a novel ThO$_2$ catalyst having a large surface area.

Still another object of the invention is to provide a novel ThO$_2$ catalyst having a surface area of about 80-125 m$^2$/g.

Yet a further object of the invention is to provide a novel high surface area ThO$_2$ catalyst with Na present as a substitutional cation.

Additional objects, advantages and novel features of the invention will be set forth in part in the description which follows, and in part will become apparent to those skilled in the art on examination of the following, or may be learned by practice of the invention. The objects and advantages of the invention may be realized and attained by means of the instrumentalities and combinations particularly pointed out in the appended claims.

To achieve the foregoing and other objects, and in accordance with the purpose of the present invention as embodied and broadly described herein, the method of synthesizing a ThO$_2$ catalyst comprises simultaneously mixing an aqueous solution of Th(NO$_3$)$_4$.4H$_2$O (having a solution temperature between about its boiling temperature and a temperature of about 15° C. less than its boiling temperature) with an aqueous solution of Na$_2$CO$_3$.H$_2$O which has a solution temperature between about its boiling temperature and a temperature of about 15° C. less than its boiling temperature. This mixing produces a solution of solid $ThOCO_3$. The solid $ThOCO_3$ is separated from the solution, and calcined at a temperature of about 225°–300° C. for about 40–55 hours to produce $ThO_2$.

In a further aspect of the present invention, in accordance with its objects and purposes, a $ThO_2$ catalyst is synthesized which has a BET surface area of about 80–125 m$^2$/g.

The novel synthesis method of the present invention produces a high surface area $ThO_2$ catalyst, e.g., a catalyst having a BET surface area in the range of about 80–125 m$^2$/g. Na is present in the catalyst as a substitutional cation in an amount of about 5–10 atom percent. This catalyst is synthesized by simultaneously mixing aqueous solutions of $Th(NO_3)_4.4H_2O$ with an aqueous solution of $Na_2CO_3.H_2O$ to produce $ThOCO_3$. The $ThOCO_3$ is then calcined at a temperature of about 225°–300° C. for about 40–55 hours.

Contrary to prior teachings, the two initial aqueous solutions are mixed simultaneously, and the $ThOCO_3$ is calcined at a much lower temperature than previously taught. The end result is a high surface area $ThO_2$ catalyst which has Na present as a substitutional cation, and which has a lattice parameter of about 5.00 to 6.00 Å. The characteristics of this catalyst make it particularly suitable for catalytic activity.

DESCRIPTION OF THE DRAWINGS

The accompanying drawing, which is incorporated and forms a part of the specification, illustrates various embodiments of the invention and, together with the description, serves to explain the principles of the invention.

DETAILED DESCRIPTION OF THE PREFERRED EMBODIMENT

Figure 1:
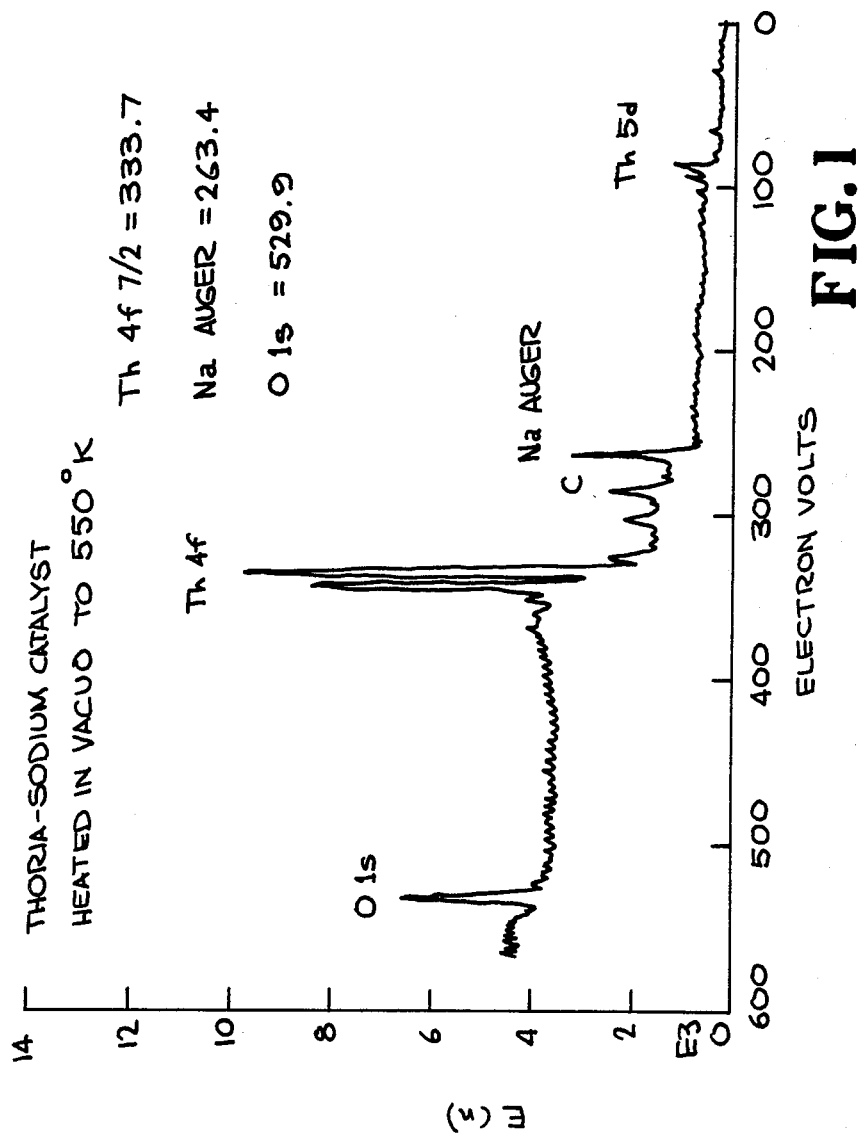
FIG. 1 is an Auger electron spectrograph of the $ThO_2$ catalyst of the present invention at 550° K.

The present invention provides a method of synthesizing a $ThO_2$ catalyst having a high surface area. This method comprises simultaneously mixing an aqueous solution of $Th(NO_3)_4.4H_2O$ with an aqueous solution of $Na_2CO_3.H_2O$. The two solutions each have a solution temperature, before the mixing, which is maintained in the range of about 15° C. below its boiling temperature and its boiling temperature. Mixing produces a solution and solid $ThOCO_3$. The solid $ThOCO_3$ is separated from the solution, and calcined at a temperature of about 225°–300° C. for about 40–55 hours to produce $ThO_2$.

The $ThO_2$ catalyst produced has a BET (Brunauer Emmett Teller) surface area of about 80–125 m$^2$/g. It has a lattice parameter of about 5.00 to 6.00 Å. Na is present in the catalyst as a substitutional cation (e.g., Na is substituted in the catalyst without disturbing the basic catalyst structure) in an amount of about 5–10 atom percent.

The synthesis method further includes adding to the solution and $ThOCO_3$ solid a predetermined amount of water, stirring this solution, then filtering the solution to separate the water and any contaminants from solid $ThOCO_3$. This procedure is repeated a predetermined number of times until purification is completed. In one embodiment of the invention, three washings and filterings occur.

Preferred concentrations of the initial $Th(NO_3)_4.4H_2O$ and $Na_2CO_3.H_2O$ solutions are about 0.50 to 1.75 molal and about 1.50 to 2.50 molal, respectively.

In one embodiment of the invention, the temperatures of the initial solutions are maintained between their boiling temperatures and a temperature of about 15° less than their boiling temperatures. In another embodiment, the two solutions are maintained at about their boiling temperatures prior to mixing.

$ThOCO_3$, produced according to the method of the present invention, is calcined at a temperature of about 225°–300° C. More preferably, it is calcined at a temperature of about 250°–280° C., and still more preferably the temperature of calcination is about 250° C.

The calcination at the desired temperature occurs for about 40–55 hours to produce $ThO_2$. More preferably, the time period is about 45–50 hours, and most preferably the time period is about 48 hours.

Prior to calcination, the $ThOCO_3$ is optionally air-dried to remove water.

This synthesis method produces a $ThO_2$ catalyst having a BET surface area of about 80–125 m$^2$/g. Preferably, the surface area is about 100–120 m$^2$/g, and most preferably, the surface area is about 115–120 m$^2$/g. Na is present in the $ThO_2$ as a substitutional cation in an amount of about 5–10 atom percent. The compound has a lattice parameter of about 5.00 to 6.00 Å. Preferably, the lattice parameter is about 5.25 to 5.75 Å, and most preferably, about 5.50 to 5.60 Å.

The following examples illustrate certain embodiments of the present invention, and are not intended to limit the scope of the invention which is defined in the appended claims.

EXAMPLE 1

A 0.66 molal solution of thorium nitrate tetrahydrate and a 1.59 molal solution of sodium carbonate were prepared and heated to boiling. The sodium carbonate solution was rapidly added to the thorium nitrate solution, and the resulting mixture stirred for 10 minutes. The mixture was filtered, the solid saved, and the solution discarded. The solid was placed in a glass vessel and a volume of distilled water equal to the sum of the original solutions added. This mixture was stirred for several minutes and then filtered, with the liquid being discarded. The washing procedure was done three times. The solid was then air-dried and then calcined for 40 hours at 250° C. X-ray diffraction of the catalyst showed it to be $ThO_2$ with a lattice parameter of 5.57 Å. The BET surface area was 113 m$^2$/g. The catalyst was further analyzer by Auger electron spectroscopy and X-ray photoelectron spectroscopy, which revealed the presence of Na as a substitutional cation in an amount of about 5–10 atom percent (FIG. 1).

EXAMPLES 2 AND 3

The $ThO_2$ catalyst of the present invention is prepared according to the method of Example 1, except with different concentrations of starting solutions, as shown in Table III.

TABLE III

| Example | $Th(NO_3)_4.4H_2O$ Concentration (molal) | $Na_2CO_3.H_2O$ Concentration (molal) |
|---|---|---|
| 2 | 1.58 | 2.32 |
| 3 | 1.58 | 1.75 |

EXAMPLE 4

The $ThO_2$ catalyst of the present invention is prepared according to the method of claim 1, except the initial starting solutions of the $Th(NO_3)_4.4H_2O$ and $Na_2CO_3.H_2O$ are maintained at temperatures of about 15° C. less than their respective boiling temperatures, prior to their mixing.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical applications, to thereby enable others skilled in the art to best utilize the invention and its various embodiments and modifications as are suited to the particular use contemplated. It is intended that the scope of the invention be defined by the claims appended hereto.

We claim:

1. A method of synthesizing a sodium substitutional cation high surface area $ThO_2$ catalyst having a BET surface area of about 80–125 $m^2/g$, comprising:
   (a) simultaneously mixing an aqueous solution of $Th(NO_3)_4.4H_2O$ having a concentration of about 0.50 to 1.75 molal and a solution temperature between about its boiling temperature and a temperature of about 15° C. less than its boiling temperature, with an aqueous solution of $Na_2CO_3.H_2O$ having a concentration of about 1.50 to 2.50 molal and a solution temperature between about its boiling temperature and a temperature of about 15° C. less than its boiling temperature, to produce a solution and solid $ThOCO_3$;
   (b) separating said solid $ThOCO_3$ formed in step (a) from solution; and
   (c) calcining said $ThOCO_3$ from step (b) at a temperature of about 225°–300° C. for about 40–55 hours to produce $ThO_2$.

2. The method according to claim 1, wherein the separation of $ThOCO_3$ from solution comprises:
   ($a_1$) adding to said $ThOCO_3$ a predetermined amount of water;
   ($b_1$) stirring said resulting solution of ($a_1$); and
   ($c_1$) filtering said solution to separate water and contaminants from $ThOCO_3$.

3. The method according to claim 2, wherein steps ($a_1$), ($b_1$) and ($c_1$) are sequentially repeated a predetermined number of times.

4. The method according to claim 1, wherein the temperature of said $Th(NO_3)_4.4H_2O$ solution of step (a), prior to mixing, is about its boiling temperature, and the temperature of said $Na_2CO_3.H_2O$ solution of step (a) is about its boiling temperature.

5. The method according to claim 1, wherein said $ThOCO_3$ of step (c) is calcined at a temperature of about 250° C. to 280° C.

6. The method according to claim 1, wherein said $ThOCO_3$ of step (c) is calcined at a temperature of about 250° C.

7. The method according to claim 6, wherein said $ThOCO_3$ of step (c) is calcined at a temperature of about 250° C. for about 45 to 50 hours.

8. The method according to claim 6, wherein said $ThOCO_3$ of step (c) is calcined at a temperature of about 250° C. for about 48 hours.

9. A $ThO_2$ catalyst prepared according to the method of claim 1.

10. The $ThO_2$ catalyst prepared according to the method of claim 1 wherein said BET surface area is about 100–120 $m^2/g$.

11. The $ThO_2$ catalyst prepared according to the method of claim 1 wherein said BET surface area is about 115–120 $m^2/g$.

12. The $ThO_2$ catalyst prepared according to the method of claim 1 wherein said catalyst has a lattice parameter of about 5.00–6.00 Å.

13. The $ThO_2$ catalyst prepared according to the method of claim 1 wherein said catalyst has a lattice parameter of about 5.25–5.75 Å.

14. The $ThO_2$ catalyst prepared according to the method of claim 1 wherein said catalyst has a lattice parameter of about 5.50–5.60 Å.

15. The $ThO_2$ catalyst prepared according to the method of claim 1 wherein said catalyst includes Na present as a substitutional cation in an amount equal to about 5–10 atom percent.

* * * * *